United States Patent [19]

Suzuki

[11] 4,449,788

[45] May 22, 1984

[54] MAGNETIC ANGLE ADJUSTING ARRANGEMENT FOR MIRROR OF MOTOR VEHICLE

[75] Inventor: Masaru Suzuki, Chiryu, Japan

[73] Assignee: Kabushiki Kaisha Tokai Rika Denki Seisakusho, Aichi, Japan

[21] Appl. No.: 358,795

[22] Filed: Mar. 16, 1982

[30] Foreign Application Priority Data

Mar. 31, 1981 [JP] Japan ............................. 56-47525[U]

[51] Int. Cl.³ ........................ G02B 5/08; F16H 13/12
[52] U.S. Cl. ............................... 350/289; 74/DIG. 4; 74/625
[58] Field of Search ............. 350/289, 307; 74/501 M, 74/625, DIG. 4

[56] References Cited

U.S. PATENT DOCUMENTS 4,362,362 12/1982 Usami et al. ..................... 350/289

FOREIGN PATENT DOCUMENTS 55-69358 5/1980 Japan ............................. 74/DIG. 4

*Primary Examiner*—John K. Corbin
*Assistant Examiner*—David Lewis
*Attorney, Agent, or Firm*—Wenderoth, Lind & Ponack

[57] ABSTRACT

The disclosure is directed to an angle adjusting arrangement for mirror for use in a motor vehicle and the like, which is free from variations due to atmospheric temperatures, in the state of magnetic coupling between driving mechanisms and the mirror so as to achieve a predetermined coupled state for positive operations at all times, and is also capable of manual adjustments as desired, without a possibility of any damage to the arrangement.

6 Claims, 3 Drawing Figures

MAGNETIC ANGLE ADJUSTING ARRANGEMENT FOR MIRROR OF MOTOR VEHICLE

BACKGROUND OF THE INVENTION

The present invention relates to an angle adjusting arrangement for a mirror and more particularly, to an arrangement for adjusting the angle, for example, of the so-called outer or external reflecting mirror such as the fender mirror, door mirror, etc. for motor vehicles, from the interior of the motor vehicles through remote control.

Initially, for the angle adjusting arrangement of the above described type, a wire control system which effects the angle adjustments by moving the mirror through a wire was adopted, but thereafter, there has been proposed an electric driving system in which driving motors and power transmission members are accommodated on the back of the mirror in a mirror case for electrically adjusting the angles of the mirror, with further improvements being applied thereto up to the present.

Although the angle adjusting arrangement of the electric driving system as described above further includes various types of devices, it is generally arranged as described hereinbelow.

More specifically, a mirror is pivotally coupled, at its generally central portion, to a predetermined position on the outer surface of a housing or casing of the angle adjusting arrangement through a universal joint system, one end of a first mirror push-pull control shaft for vertically tilting the mirror is connected to the upper or lower side of the pivotal coupling at the rear face of the mirror and also one end of a second push-pull control shaft for inclining the mirror in the leftward or rightward direction is connected to the left or right side of said pivotal coupling through universal joint systems respectively, while the other ends of the first and second push-pull control shafts are led into the casing through inserting openings formed in said casing. In the casing, driving mechanisms including reversible motors and transmission members are accommodated for transmitting the driving force of the motors to the other ends of said first and second push-pull control shafts, and thus, by driving said driving mechanisms, the mirror is adapted to be tilted or inclined through axial displacement of the respective mirror push-pull control shafts.

Even in the mirror angle adjusting arrangement of the electrically driven type as described above, however, it is necessary that the mirror angle can be manually adjusted in the event of troubles and the like in the arrangement, and the connections between the mirror and driving mechanism are loose couplings, which may be achieved, for example, by providing each of the mirror push-pull control shafts with an elastic or resilient material such as urethane rubber, silicone rubber, natural rubber or the like, and engaging a gear having a female-threaded central opening with said control shaft, with the surface of the push-pull control shaft being finished so as to be smooth or to have a male thread thereon in loose engagement with the female thread of the gear. In the above arrangement, upon rotation of the gear by the driving mechanism, the screw thread of the gear is forced onto the surface of the push-pull control shaft, or the push-pull control shaft is axially displaced by the action of the male thread loosely engaged with the female thread of the gear, for tilting the mirror. On the other hand, when the mirror is manually moved, the female thread of the gear slides along the smooth or male-threaded surface of the push-pull control shaft so as to allow the axial displacement of the control shaft irrespective of the presence of the gear, thus making it possible to manually adjust the angle of the mirror. However, in the conventional arrangement as described above in which the push-pull control shafts are made of elastic material, there have been such problems that, since the hardness of the elastic material employed therefore tends to change due to variations in atmospheric temperatures so as to become rather soft at high temperatures and rather hard at low temperatures, smooth operation of the arrangement is undesirably obstructed due to variations in the state of coupling or the coupled portions may be broken due to undue force applied thereto particularly at low temperatures.

SUMMARY OF THE INVENTION

Accordingly, an essential object of the present invention is to provide an angle adjusting arrangement for a mirror for use in a motor vehicle and the like, which is free from variations, due to atmospheric temperatures, in the state of the coupling between driving mechanisms and the mirror so as to achieve a predetermined coupled state for positive operations at all times, and is also capable of manual adjustments as desired, without the possibility of any damage thereto, with substantial elimination of disadvantages inherent in the conventional arrangements of this kind.

Another important object of the present invention is to provide an angle adjusting arrangement for a mirror as described above, which has a simple construction and functions stably and with high reliability, and can be readily incorporated into various motor vehicles at low cost.

In accomplishing these and other objects, according to one preferred embodiment of the present invention, there is provided an angle adjusting arrangement for mirror of a motor vehicle and the like, including a casing which is fixedly provided within a mirror case at a position behind a mirror, and to which approximately at a central portion of a rear face thereof a back cover member for supporting the mirror is pivotally connected, and mirror push-pull control shafts are each loosely or movably connected, at corresponding ends thereof, to the back cover member, selectively at an the upper or lower side, and at a right or left side with respect to the central pivotal connection of the back cover member, and which control shafts are magnetically coupled at the other ends thereof to driving mechanisms for selective advancing and retraction of the mirror push-pull control shafts in the axial direction thereof. Each of said push-pull control shafts includes a main portion which is made of magnetic material and which has its one surface alternately magnetized in N and S poles in the longitudinal direction thereof, while each of the driving mechanisms has an operating plate provided with a peripheral surface made of magnetic material, and connected for rotation to the driving mechanism so as to confront the magnetized surface of the push-pull control shaft, and the operating plate has its peripheral surface alternately magnetized in N and S poles so as to confront and correspond to the magnetized surface of the push-pull control shaft with a minor clearance there-between for magnetic coupling between the operating plate and the push-pull control shaft.

By the arrangement of the present invention as described above, an improved angle adjusting arrangement which is not affected during operation by variations in the atmospheric temperatures, etc., and which is also capable of manual adjustments, has been advantageously provided and which has a simple construction and at high reliability.

BRIEF DESCRIPTION OF THE DRAWINGS

These and other objects and features of the present invention will become apparent from the following description of the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
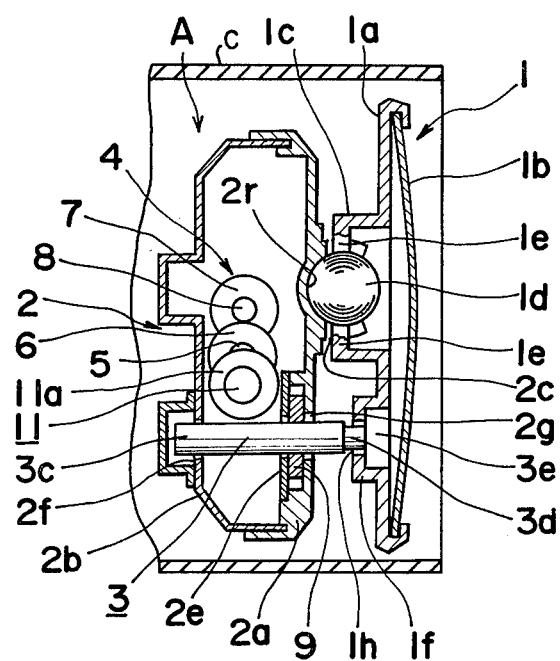
FIG. 1 is a side sectional view of an angle adjusting arrangement according to one preferred embodiment of the present invention as attached to a rear face of a mirror.

Referring now to the drawings, the present invention will be described in detail hereinbelow.

In the first place, it is to be noted that, in the following embodiment, the present invention is described as applied to an angle adjusting arrangement having a two motor type driving mechanism, although it may similarly be applied to an angle adjusting arrangement with a one-motor and one-electrode solenoid type driving mechanism.

As shown in FIG. 1, the angle adjusting arrangement generally indicated at A is accommodated behind a mirror 1 housed in a mirror case C shown partially in FIG. 1, and includes a housing or casing 2 secured in the mirror case and composed of an upper casing part 2b fitted onto a lower casing part 2a to constitute said casing 2, while the approximately central portion of the rear face of the mirror 1 is pivotally connected to the lower casing part 2a through a universal joint system in a manner as described hereinbelow.

More specifically, a mirror back cover 1a, which holds a mirror body 1b on its front face, is provided, at its central portion, with a hole 1g (FIG. 2), and around the hole 1g, with a cylindrical portion 1c projecting away from the rear face. The mirror back cover 1a further includes a spherical member 1d connected to the interior of said cylindrical portion 1c by four rods 1e radially outwardly extending from the spherical member 1d. On the other hand, at the approximately central portion of the lower casing part 2a, there is provided a bearing portion 2c, which has a spherical recess 2r with which the spherical member 1d is engaged and slits 2d with which the respective rods 1e are engaged. Therefore, the spherical member 1d and the rods 1e provided at the side of the mirror are respectively engaged with the spherical recess 2r of the bearing portion 2c and the slits 2d at the side of the casing 2, and thus, the mirror 1 may be tilted or inclined as desired in the vertical direction and lateral direction with respect to the casing 2.

Figure 2:
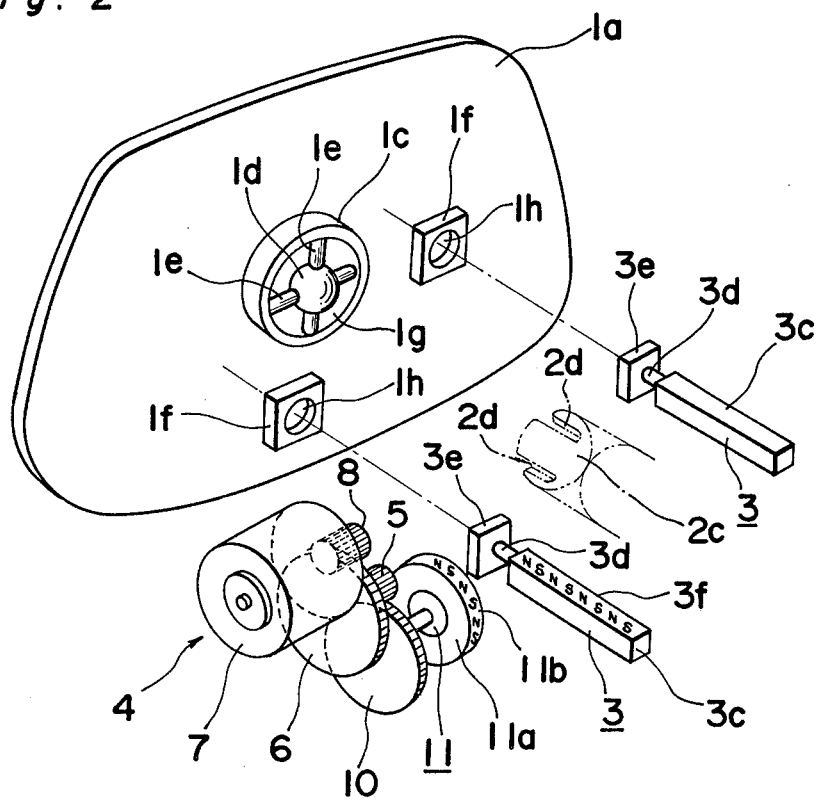
FIG. 2 is a perspective exploded view showing a main portion of the angle adjusting arrangement of FIG. 1.

Mirror push-pull control shafts 3 are respectively coupled, at corresponding ends thereof, to the mirror back cover at a point below the spherical member 1d of the mirror back cover 1a and to the right thereof in a manner as described below, while the other ends of the control shafts 3 are introduced into the casing 2 through insertion openings 2g formed in the bottom portion of the lower casing part 2a. Each of the push-pull control shafts 3 has with a square cross-section rod-shaped portion 3c the outer peripheral faces of which are smooth on the free end and a square stop portion 3e on the connecting end, and a flexible narrow neck portion 3d provided between the free end and the stop portion. On the other hand, square-stepped portions 1f each having hole 1h therein are provided, respectively, below and also to the left of the spherical member 1d of the mirror cover 1a (FIG. 2). For assembly, before the mirror body 1b is secured to the mirror back cover 1a, each of the mirror push-pull control shafts 3 is inserted into the hole 1h of the corresponding stepped portion 1f from the front side of the mirror cover 1a so that the rod-shaped portion 3c and narrow neck portion 3d extends out of the mirror cover 1a, so that the stop portions 3e thereat are engaged in the corresponding recesses of the stepped portions 1f so as to be loosely held thereat. Meanwhile, the square-rod-shaped portions 3c of the control shafts 3 are each movably supported for displacement in the axial direction by a support wall 2e of the lower casing part 2a and a support wall 2f of the upper casing part 2b. Each of the square-rod-shaped portions 3c of the control shaft 3 is made of a magnetic material such as sintered alloy of anisotropic ferrite, etc., while the narrow neck portion 3d and the stop portion 3e thereof are formed of a combination of different parts made of silicone rubber or the like from the portions 3c. A sealing member 9 formed by impregnation of a felt of fiber texture or expanded material of cellular structure by lubricating oil is disposed between the insertion hole 2g and the support wall 2e.

On the other hand, within the casing 2, there are provided driving mechanisms 4 for driving the push-pull control shafts 3. It is to be noted that in FIGS. 1 and 2, only one set of the driving mechanisms is shown for brevity. Each of the driving mechanisms 4 includes a reversible motor 7, a gear 8 secured to an output shaft of the motor 7, a gear 6 engaged with the gear 8, a gear 5 coaxial with the gear 6, a gear 10 in mesh with the gear 5, and a disc-shaped operating plate 11 mounted on the same shaft as the gear 10. The operating plate 11 has on its outer periphery an annular magnetic member 11a of sintered alloy of anisotropic ferrite or the like, similar to that for the square-rod-shaped portion 3c of the control shaft 3. The operating plate is opposed, at its outer periphery, to the square-rod-shaped portion 3c of the control shaft with a minor predetermined clearance G therebetween in the assembled state.

Figure 3:
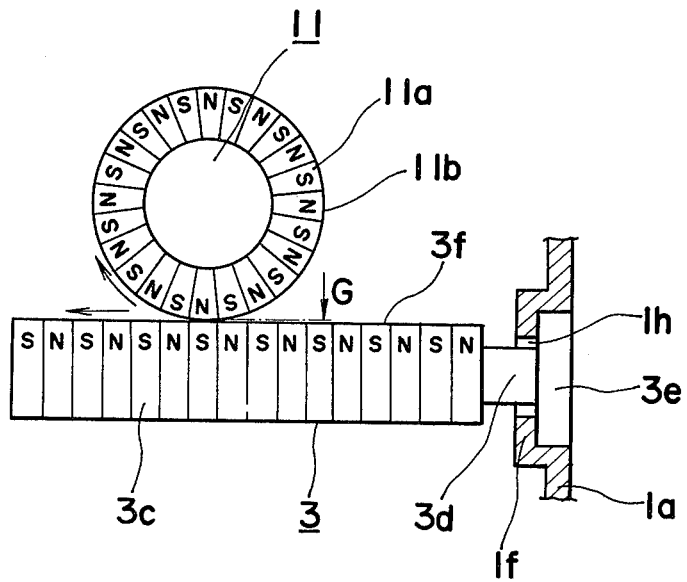
FIG. 3 is a side elevational view partly in section, showing an essential portion of the arrangement of FIG. 1.

The upper face of the square-rod-shaped portion 3c of the push-pull control shaft 3 and the outer peripheral face of the annular magnetic material 11a of the operating plate 11, which confront each other, are respectively formed by magnetized faces 3f and 11b respectively having N and S poles alternately magnetized and at the same pitch as shown in FIG. 3 and opposed across the clearance G to an opposite pole for being magnetically coupled by the attraction between the opposite poles. Accordingly, when the motor 7 is driven by a switching operation, the rotating speed of the operating plate 11 is reduced through the series of gears 8, 6, 5 and 10, and is rotated, for example, clockwise as shown in FIG. 3, and correspondingly, the push-pull control shaft 3 moves towards the left in FIG. 3 by the attraction between the magnetized faces 3f and 11f to pull the portion of the mirror cover 1a at the hole 1h, so that the mirror 1 is inclined so that the mirror body 1b faces downwardly in FIG. 1. On the other hand, when the operating plate 11 is rotated counterclockwise, the push-pull control shaft 3 moves towards the right in FIG. 1 to tilt or raise the mirror 1 so that the mirror body 1b faces upwardly, and thus, the angle of the mirror 1 may be adjusted from a remote position through the electrical driving.

On the other hand, for manually adjusting the position of the mirror 1, the mirror 1 is only required to be manually moved to a desired angle. Since the operating plate 11 and the push-pull control shaft 3 are merely magnetically coupled with each other, the mirror may be moved by relative sliding between the magnetic faces 3f and 11b, if the manual force is larger than the attraction between the opposite magnetic faces 3f and 11b, and thus, the mirror may be positionally adjusted to any desired angle by a manual operation.

The magnetization of the faces of the rod-shaped body 3c and the annular member 11a with alternately different N and S poles as shown in the above described embodiment, may be readily effected, for example, by a method in magnetizing heads (not shown) with alternately different polarities at a predetermined pitch are used to apply magnetic fields of 1500 to 2000 gauss to the rod-shaped body and to the annular member for the magnetization. Moreover, if the pitch of magnetization on each of the magnetized faces 3f and 11b is the same, different poles are opposed to each other to produce a large attraction, and when the square-shaped push-pull control shafts with flat magnetized faces are employed a larger attracting force may be obtained.

As is clear from the foregoing description, according to the present invention, the push-pull control shafts coupled to the mirror, and the operating plates connected to the driving mechanisms, are respectively made of magnetic material at their main portions, while the mutually confronting faces of the control shafts and operating plates are alternately magnetized with N and S poles for magnetical coupling therebetween through attraction between the different poles. Accordingly, the coupling condition between the driving mechanism and the mirror is not changed due to variations in the atmospheric temperatures, etc. and a predetermined state of coupling is achieved at all times for positive functioning, while the angles of the mirror may be manually adjusted as desired, since the coupled portions have no contacting portions, without any possibility of wearing out or breakage due to application of undue force, and thus, an angle adjusting arrangement having superior reliability has been advantageously provided.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An angle adjusting arrangement for mirror of a motor vehicle and the like, comprising: a mirror case; a mirror in said mirror case; a casing which is fixedly provided within said mirror case at a position behind a mirror; a back cover member supporting the mirror; means pivotally connecting the central portion of the rear face thereof to said casing; mirror push-pull control shafts each loosely connected, at corresponding ends thereof, to the back cover member, at an upper or lower side, and at a right or left side with respect to said central pivotal connection of the back cover member; and driving mechanisms coupled to the other ends of said push-pull control shafts for selective advancing and retraction of said mirror push-pull control shafts in the axial direction thereof, each of said push-pull control shafts including a main portion which is made of magnetic material and which has its one surface alternately magnetized in N and S poles in the longitudinal direction thereof, each of said driving mechanisms having an operating plate provided with a peripheral surface made of magnetic material, and connected for rotation to said driving mechanism and confronting said magnetized surface of said push-pull control shaft, said operating plate having said peripheral surface alternately magnetized in N and S poles so as to correspond to said magnetized surface of said push-pull control shaft for magnetic coupling between said operating plate and said push-pull control shaft.

2. An angle adjusting arrangement as claimed in claim 1, wherein said means pivotally back cover member comprises to said casing through a spherical member fixedly provided at the approximately central portion of said back cover member and a corresponding recess formed in said casing for movably receiving therein said spherical member.

3. An angle adjusting arrangement as claimed in claim 1, wherein said corresponding end of each of said push-pull control shafts is provided with a stop portion and a narrow neck portion between said stop portion and main portion of said push-pull control shaft, said stop portion and narrow neck portion being made of a resilient material different from the magnetic material of said main portion, and a corresponding stepped portion with an opening therein on said back cover member into which said stop is fitted for providing said loose connection between said corresponding ends of said push-pull control shafts and said back cover member.

4. An angle adjusting arrangement as claimed in claim 1, wherein said casing includes a lower casing part and an upper casing part fitted onto said lower casing to define a space therebetween in which said driving mechanisms are accommodated.

5. An angle adjusting arrangement as claimed in claim 4, wherein each of said driving mechanisms comprises a reversible motor and a train of gears which includes a gear secured to an output shaft of said reversible motor and another gear mounted on the same shaft as that for said operating plate for transmission of a driving force of said reversible motor to said operating plate.

6. An angle adjusting arrangement as claimed in claim 1, wherein said magnetized one surface of said push-pull control shaft and said magnetized peripheral surface of said operating plate have alternate N and S poles at the same pitch, and have a minor predetermined clearance therebetween.

* * * * *